United States Patent
Evers et al.

(10) Patent No.: US 10,443,536 B2
(45) Date of Patent: Oct. 15, 2019

(54) ONE-PIECE PISTON FEATURING ADDICTIVE MACHINING PRODUCED COMBUSTION BOWL RIM AND COOLING GALLERY

(71) Applicant: FEDERAL-MOGUL LLC, Southfield, MI (US)

(72) Inventors: Ross Evers, Tecumseh, MI (US); Scott Kenningley, Weisendorf (GB); Wolfram Cromme, Burgthann (DE)

(73) Assignee: Tenneco Inc., Lake Forest, IL (US)

( * ) Notice: Subject to any disclaimer, the term of this patent is extended or adjusted under 35 U.S.C. 154(b) by 66 days.

(21) Appl. No.: 15/706,938

(22) Filed: Sep. 18, 2017

(65) Prior Publication Data
US 2018/0066603 A1 Mar. 8, 2018

Related U.S. Application Data

(62) Division of application No. 14/635,348, filed on Mar. 2, 2015, now Pat. No. 9,765,727.
(Continued)

(51) Int. Cl.
*F02F 3/22* (2006.01)
*F02F 3/00* (2006.01)
(Continued)

(52) U.S. Cl.
CPC .......... *F02F 3/0084* (2013.01); *B22F 3/1055* (2013.01); *B23K 9/044* (2013.01);
(Continued)

(58) Field of Classification Search
CPC .. F02F 3/0084; F02F 3/003; F02F 2003/0007; B23K 26/342; B23K 9/044;
(Continued)

(56) References Cited

U.S. PATENT DOCUMENTS 4,553,472 A * 11/1985 Munro ................ F02B 23/0603
29/888.045
8,459,228 B2 * 6/2013 Bischofberger ....... B23K 26/18
123/193.6
(Continued)

FOREIGN PATENT DOCUMENTS

CN 103016198 A 4/2013
DE 3032671 A1 3/1982
(Continued)

*Primary Examiner* — Marguerite J McMahon
(74) *Attorney, Agent, or Firm* — Robert L. Stearns; Dickinson Wright, PLLC

(57) ABSTRACT

A piston capable of withstanding high temperatures and extreme conditions of a combustion chamber of an internal combustion engine and manufactured with reduced costs is provided. The method of manufacturing the piston includes casting or forging the bulk of the piston as a single-piece with an open cooling gallery from an economical first material, such as steel, cast iron, or aluminum. The method further includes forming a portion of a combustion bowl surface, which is a small area of the piston directly exposed to the combustion chamber, from a second material by additive machining. The second material has a higher thermal conductivity and higher resistance to oxidation, erosion, and oil coking, compared to the first material. The additive machining process is efficient and creates little waste, which further reduces production costs.

11 Claims, 4 Drawing Sheets

Related U.S. Application Data

(60) Provisional application No. 61/947,097, filed on Mar. 3, 2014.

(51) Int. Cl.

| | | |
|---|---|---|
| *B23P 15/10* | (2006.01) | |
| *B23K 9/04* | (2006.01) | |
| *B23K 10/02* | (2006.01) | |
| *B22F 3/105* | (2006.01) | |
| *B23K 26/342* | (2014.01) | |
| *C23C 4/08* | (2016.01) | |
| *C23C 4/129* | (2016.01) | |
| *B33Y 10/00* | (2015.01) | |
| *B33Y 80/00* | (2015.01) | |
| *B23K 101/00* | (2006.01) | |

(52) U.S. Cl.
CPC .......... *B23K 10/027* (2013.01); *B23K 26/342* (2015.10); *B23P 15/10* (2013.01); *C23C 4/08* (2013.01); *C23C 4/129* (2016.01); *F02F 3/003* (2013.01); *F02F 3/22* (2013.01); *B23K 2101/003* (2018.08); *B33Y 10/00* (2014.12); *B33Y 80/00* (2014.12); *F02F 2003/0007* (2013.01); *Y10T 29/49263* (2015.01)

(58) Field of Classification Search
CPC . B23K 10/027; B23K 2101/003; B23P 14/10; B22F 3/1055; C23C 4/08
USPC .................................. 29/888.042; 123/193.6
See application file for complete search history.

(56) References Cited

U.S. PATENT DOCUMENTS

| | | | |
|---|---|---|---|
| 9,687,942 B2* | 6/2017 | Flowers | F16J 1/006 |
| 2003/0196547 A1 | 10/2003 | Bischofberger et al. | |
| 2005/0028364 A1 | 2/2005 | Issler | |
| 2007/0261663 A1 | 11/2007 | Lineton et al. | |
| 2010/0226778 A1 | 9/2010 | Wallis | |
| 2011/0186003 A1 | 8/2011 | Konrad et al. | |
| 2013/0014723 A1 | 1/2013 | Bucher | |
| 2013/0068096 A1* | 3/2013 | Gabriel | B23P 15/10 |
| | | | 92/231 |
| 2013/0133609 A1 | 5/2013 | Matsuo | |
| 2013/0213218 A1 | 8/2013 | Kaiser et al. | |
| 2014/0298987 A1* | 10/2014 | Luick | F16J 1/00 |
| | | | 92/172 |
| 2015/0314388 A1* | 11/2015 | Seifried | B23K 9/08 |
| | | | 219/100 |
| 2017/0165796 A1* | 6/2017 | Feng | B23K 9/167 |

FOREIGN PATENT DOCUMENTS

| | | |
|---|---|---|
| DE | 10029810 A1 | 12/2001 |
| DE | 102008002572 A1 | 12/2009 |
| DE | 102008035696 A1 | 2/2010 |
| DE | 102011107659 A1 | 1/2013 |
| JP | S62278282 A | 12/1987 |
| JP | H07139424 A | 5/1995 |
| JP | H11200946 A | 7/1999 |
| JP | 2001082247 A | 3/2001 |
| JP | 2001335814 A | 12/2001 |
| JP | 2004308661 A | 11/2004 |
| JP | 2009536712 A | 10/2009 |
| JP | 2009540199 A | 11/2009 |
| JP | 3175033 U | 4/2012 |
| JP | 2013545924 A | 12/2013 |

\* cited by examiner

ONE-PIECE PISTON FEATURING ADDICTIVE MACHINING PRODUCED COMBUSTION BOWL RIM AND COOLING GALLERY

CROSS REFERENCE TO RELATED APPLICATION

This U.S. divisional patent application claims the benefit of U.S. utility patent application Ser. No. 14/635,348, filed Mar. 2, 2015 which claims the benefit of U.S. provisional patent application No. 61/947,097, filed Mar. 3, 2014, the entire contents of which is incorporated herein by reference.

BACKGROUND OF THE INVENTION

1. Field of the Invention

This invention relates generally to pistons for internal combustion engines, and methods of manufacturing the pistons.

2. Related Art

A piston used in internal combustion engines, such as a heavy duty diesel piston or light vehicle duty steel piston, is exposed to high temperatures and harsh conditions during operation, especially along the uppermost surface of the piston which faces a combustion chamber. Exposure to the harsh conditions of the combustion chamber makes the piston susceptible to oxidation, erosion, and coking. Therefore, the piston is typically designed with a cooling gallery beneath the uppermost surface. Cooling oil, or another cooling fluid, is typically contained in the cooling gallery to dissipate heat away from the uppermost surface of the piston as the piston reciprocates in the cylinder bore beneath the combustion chamber. Cooling oil can also be sprayed under the combustion bowl of the piston to dissipate heat.

The piston is also preferably formed of a material capable of withstanding the high temperatures and harsh conditions of the combustion chamber. For example, materials having a high thermal conductivity, hot oxidation resistance, exceptional thermal properties, and resistance to erosion and oil coking are preferred. Unfortunately, such materials are typically expensive and therefore are oftentimes not a practical or economical option.

SUMMARY OF THE INVENTION

One aspect of the invention provides a more practical and economical method of manufacturing a piston capable of withstanding the extreme temperatures and conditions of a combustion chamber. The method includes forming a crown portion and a skirt portion from a first material, and forming at least a portion of a combustion surface along the crown portion from a second material by an additive machining process. The additive machining process is efficient and creates little waste material, which reduces production time and costs. In addition, the combustion surface, which is directly exposed to the extreme conditions of the combustion chamber and thus more susceptible to erosion and oil coking, can be formed from a high performance metal, such as stainless steel, a nickel-based alloy, or a nickel-chromium-based alloy, while the bulk of the crown portion and skirt portion, which is located further from the combustion chamber, can be formed from a more economical metal.

Another aspect of the invention provides a piston capable of withstanding the high temperatures and harsh conditions of a combustion chamber, and which is manufactured with reduced costs. The piston includes a crown portion, a skirt portion, and a combustion surface disposed along the crown portion. The crown portion and the skirt portion are formed from a first material, and at least a portion of the combustion surface is formed from a second material by an additive machining process. The piston also includes a heat affected zone defined by a first edge along the first material and a second edge along the second material, wherein the first edge has a shape which follows the shape of the second edge. The shape of the heat affected zone indicates that the additive machining process was used to form the combustion surface.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION

One aspect of the invention provides an economical method of manufacturing a piston 20 for use in an internal combustion engine which is capable of withstanding the high temperatures and harsh conditions of the combustion chamber with reduced production costs and complexity.

The method begins by forming the bulk of the piston 20, including a crown portion 22 and a skirt portion 24, as a single-piece from a first material. The first material is typically an economical metal material, such as steel, cast iron, a cast iron alloy, aluminum, or an aluminum alloy. The first material can include a single composition or a mixture of different metal compositions. A casting or forging process is preferably used to form the bulk of the piston 20 from the first material.

Figure 1:
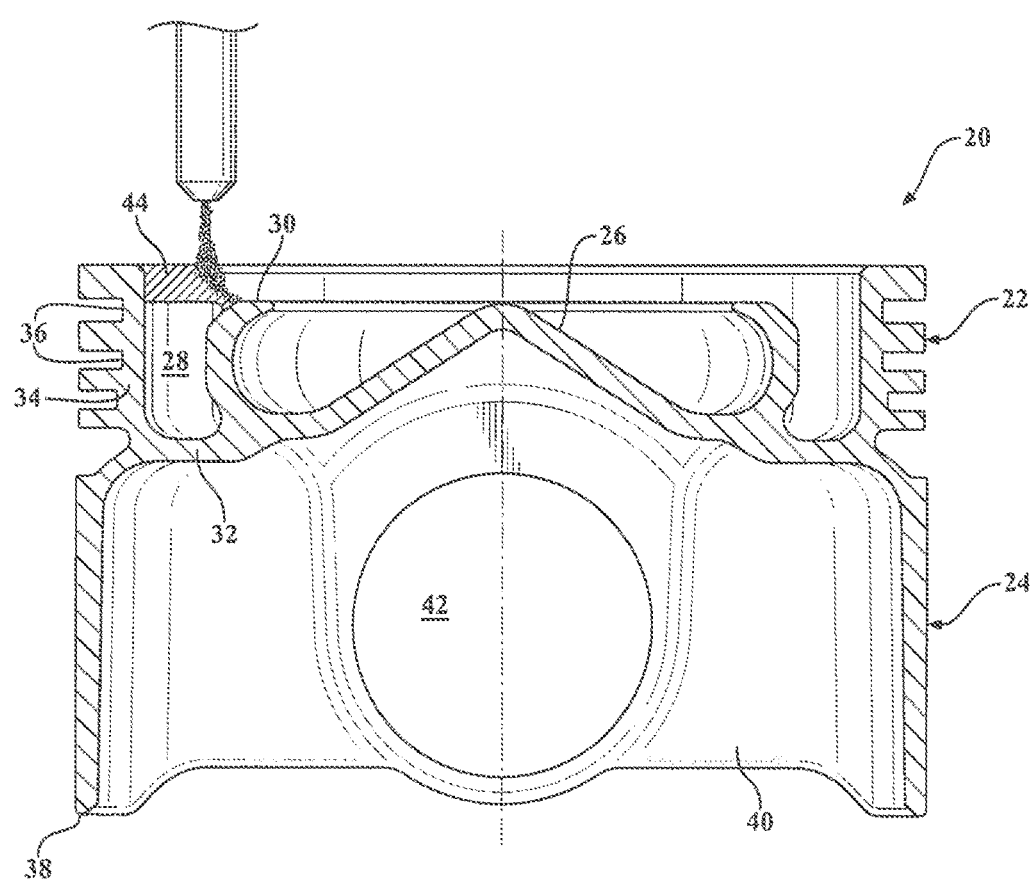
FIG. 1 is a side cross-sectional view of a piston according to an exemplary embodiment showing a combustion surface above a cooling gallery and a combustion bowl rim being formed by an additive machining process.
Figure 2:
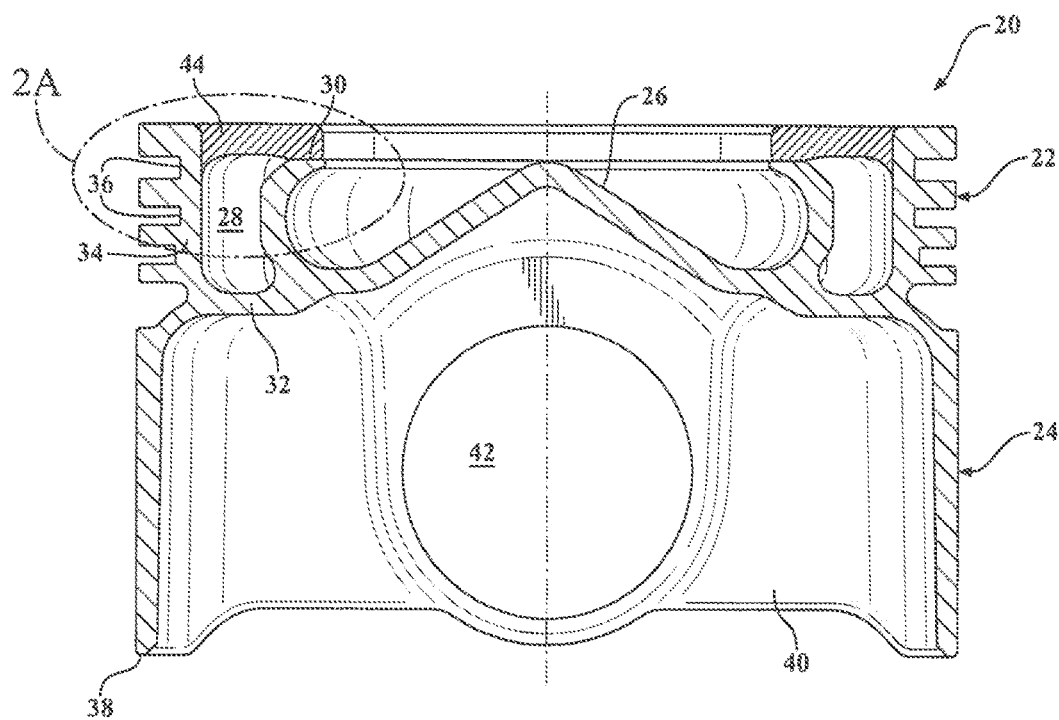
FIG. 2 is a side cross-sectional view of the piston of FIG. 1 after the additive machining process is complete.
Figure 3:
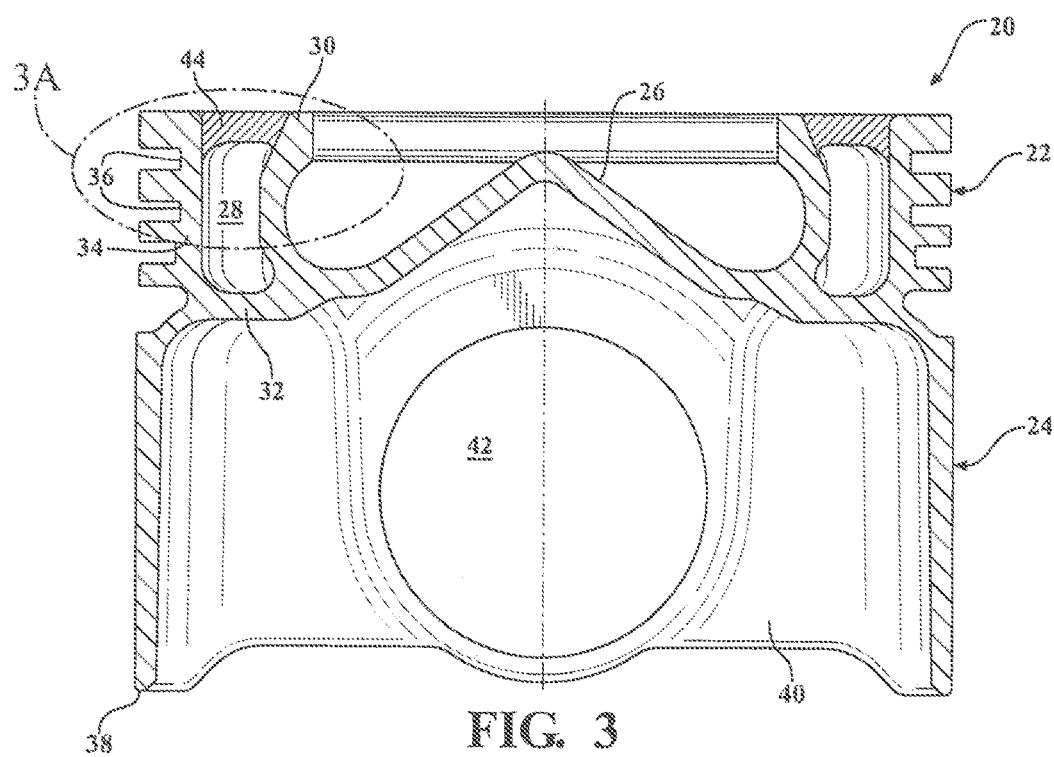
FIG. 3 is a side cross-sectional view of a piston according to another exemplary embodiment, wherein a portion of the combustion surface is formed by the additive machining process.

The piston 20 can comprise various different designs and geometries, depending on the type of piston and/or the engine for which the piston is designed. In the exemplary embodiment shown in FIGS. 1-3, the piston 20 is referred to as a light vehicle duty (LVD) piston, and the bulk of the piston, including the crown portion 22 and the skirt portion 24, are formed of steel. In this case, the casting or forging step includes forming the crown portion 22 to include a combustion bowl 26 and an open cooling gallery 28. As shown in FIG. 1, the combustion bowl 26 includes an apex at a center axis A and extends outwardly from the center axis A to a free upper end 30. A cooling gallery base wall 32 extends outwardly from a base of the combustion bowl 26, and an outer rib 34 with ring grooves 36 extends upwardly from the base wall 32 to form the open cooling gallery 28 surrounding the center axis A. The casting or forging step also includes forming the skirt portion 24 from the first material around the center axis A. The skirt portion 24 extends downwardly from the outer rib 34 to a lower end 38. The skirt portion 24 also includes a pair of pin bosses 40 disposed opposite one another and each presenting a pin bore 42 for receiving a wrist pin (not shown).

The method next includes forming at a least a portion of a combustion surface 44 from a second material by an additive machining process. FIG. 1 shows the combustion surface 44 being formed along the upper crown portion 22, specifically between the upper end 30 of the combustion bowl 26 and the outer rib 34 to close the open cooling gallery 28. The second material used to form the combustion surface 44 by the additive machining process is different from the first material. The second material is located in a position which makes it more susceptible to hot oxidation, erosion, and oil coking. Therefore the composition of the second material is selected so that it has at least one of a higher thermal conductivity, higher erosion resistance, higher resistance to oil coking, and a higher oxidation resistance than the first material. For example, the second material can be selected from stainless steel, a nickel-based alloy, and a nickel-chromium-based alloy. An example of a nickel-based alloy is marketed under the name Nimonic®, and an example of a nickel-chromium-based alloy is marketed under the name Inconel®. Thus, the second material performs better than the first material when exposed to the high temperatures and extreme conditions of the combustion chamber. The oxidation performance of the first and second materials can be determined by Thermal Gravimetric Analysis (TGA). The TGA test will determine the critical oxidation temperature of the material. The high performance second material preferable has a critical oxidation temperature higher than the expected surface temperature of the piston 20 at the upper end 30 during operation in the internal combustion engine. The second material is typically more expensive than the first material, but only a small amount of the second material is used in the areas which require the high performance, and thus production costs are reduced compared to pistons formed entirely of a high performance metal. Typically, less than 30% of the volume of the piston 20 is formed from the second material.

The additive machining process also reduces production costs because it is efficient and does not waste much of the more expensive second material. Any type of additive machining process, also referred to as three-dimensional printing, can be used. Exemplary additive machining processes include plasma transfer arc (PTA), high velocity oxygen fuel spraying (HVOF), laser cladding, laser sintering, arc welding, and additive welding. FIG. 1 is a generally illustration of a high velocity oxygen fuel spraying process.

The additive machining process typically includes melting the first material along the upper end 30 of the combustion bowl 26 or along the outer rib 34, melting the second material at the same time as the first material, and depositing a plurality of layers of the melted second material on the melted first material. In the exemplary embodiment shown in FIGS. 1 and 2, the additive machining process is used to form a combustion surface 44 extending inwardly from the outer rib 34 and including a rim of the combustion bowl 26. In this embodiment, the outer rib 34 and the remainder of the combustion bowl 26 are formed of the economical first material. In another embodiment, shown in FIG. 3, the additive machining process is used to form a portion of the combustion surface 44 located between the outer rib 34 and the rim of the combustion bowl 26 from the second material, and the outer rib 34, the rim, and the remainder of the combustion bowl 26 are formed from the first material.

In the exemplary embodiment, the step of depositing a plurality of layers of the melted second material on the melted first material is conducted using a freeform fabrication technique. Alternatively, instead of or in addition to the free form fabrication production technique, a fabrication on core technique may be employed. In this technique, a core material is disposed on the piston 20 between the outer rib 34 and the combustion bowl 26, or the rim of the combustion bowl 26. The core material has a geometry which mimics the geometry of the desired cooling gallery 28 and can be constructed of any of the following: sand, silica ceramic, or salt core technology. The high performance second material is then deposited directly on the added core material and via a plurality of layers forms the combustion surface 44 with a metallurgical bond to the piston outer rib 34 and the combustion bowl 26, or to the rim of the combustion bowl 26, and thus forms the sealed cooling gallery 28. Following the additive machining process the installed core is removed from the piston 20 via a material dependent process, such as washout, shake-out or a chemical leaching process.

Another aspect of the invention provides the piston 20 for use in the internal combustion engine which is capable of withstanding the high temperatures and extreme conditions of the combustion chamber, but is manufactured with reduced production costs and complexity compared to other similarly performing pistons.

As discussed above, the piston 20 can comprise various different geometries, depending on the type of piston 20 and/or the type of engine for which the piston is designed. As discussed above, FIGS. 1-3 are examples of light vehicle duty pistons each including the crown portion 22, the skirt portion 24, and the combustion surface 44 disposed along the crown portion 22. The crown portion 22 and the skirt portion 24 are a single-piece formed from the more economical first material, and at least a portion of the combustion surface 44 is formed from the high performance second material by the additive machining process.

The aforementioned additive manufacturing fabrication techniques can be confirmed when viewing the finished piston 20 from a macro and microscopic viewpoint. The piston manufactured according to the additive machining process of the subject invention will differ from various two piece piston welded assemblies. When viewing the piston 20 in cross section macroscopically, surface irregularities in terms of surface finish and geometry on the upper face of the cooling gallery 28, along the underside of the combustion surface 44, may be present. The irregularities will make it apparent that the combustion surface 44 geometry was constructed from additive machining, such as a multiple pass additive process. These irregularities differ from that of a machined, cast or forged construction which have a uniform appearance. Microscopically, after chemical etching, one can discern a heterogeneous microstructure throughout the applied high performance second material. This microstructure of the second material includes, and typically consists of, martensite and tempered martensite in a crystalline structure indicative of a cooling gradient towards the first material, also referred to as the piston bulk material.

Figure 2A:
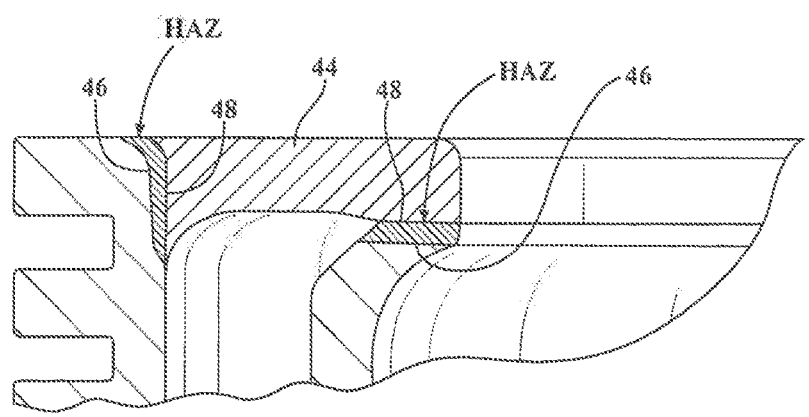
FIG. 2A is an enlarged view of a portion of the piston of FIG. 2 including a heat affected zone.
Figure 3A:
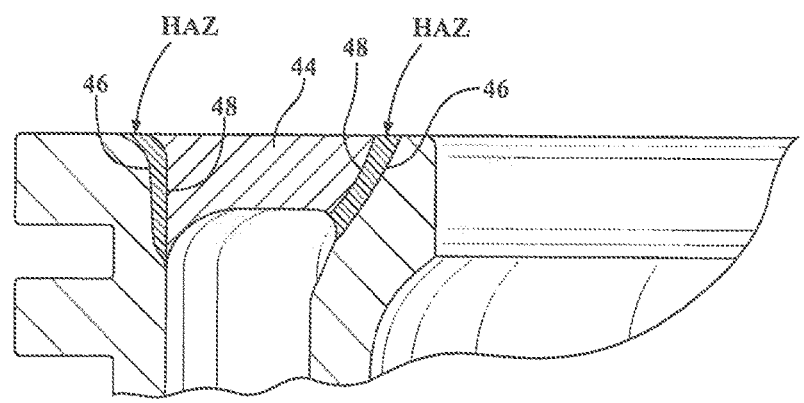
FIG. 3A is an enlarged view of a portion of the piston of FIG. 3 including a head affected zone.
Figure 4:
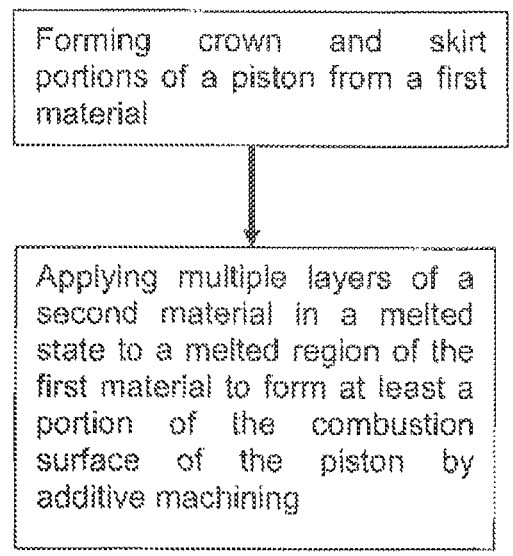
FIG. 4 provides method steps for forming a piston.

In the finished piston 20, a heat affected zone HAZ will be visible in the first material in both the piston outer rib 34 and along the combustion bowl 26 or along the rim of the combustion bowl 26. The heat affected zone HAZ will be consistent in shape along the interface of the bulk first material and the high performance second material. As shown in FIGS. 2A and 3A, in the exemplary embodiment, the heat affected zone HAZ is defined by a first edge 46 along the first material and a second edge 48 along the second material. The first edge 46 has a shape following the shape of the second edge 48, and the shape of the second edge 48 is based on the second material added during the additive machining process. The shape of the heat affected zone HAZ indicates that the additive machining process was used to form the combustion surface 44. In addition, the shape of the heat affected zone HAZ formed when the additive machining process is used differs from that of a two piece welded assembly in which the heat affected zone would be indicative of a penetration weld induced by laser or electron beam energy.

Obviously, many modifications and variations of the present invention are possible in light of the above teachings and may be practiced otherwise than as specifically described while within the scope of the appended claims.

What is claimed is:

1. A piston for an internal combustion engine, comprising:
a crown portion formed from a first material;
a combustion surface disposed along the crown portion, wherein at least a portion of the combustion surface is formed from a second material by an additive machining process, and the second material includes martensite and tempered martensite in a crystalline structure; and
a heat affected zone defined by a first edge along the first material and a second edge along the second material, wherein the first edge has a shape following the shape of the second edge.

2. The piston of claim 1, wherein a single piece of the first material forms the crown portion; and the second material has at least one of a higher thermal conductivity, higher erosion resistance, higher resistance to coking adhesion, and a higher oxidation resistance than the first material.

3. The piston of claim 1, wherein the crown portion formed from the first material and the combustion surface formed from the second material together form a closed cooling gallery.

4. The piston of claim 1, wherein the second material forming the at least the portion of the combustion surface includes stainless steel, a nickel-based alloy, or a nickel-chromium-based alloy.

5. The piston of claim 1, wherein the first material forming the crown portion includes steel, cast iron, a cast iron alloy, aluminum, or an aluminum alloy.

6. The piston of claim 1, wherein the crown portion includes a combustion bowl, and the combustion bowl includes an apex at a center axis.

7. The piston of claim 1, wherein the crown portion includes a combustion bowl, a cooling gallery base wall extends outwardly from a base of the combustion bowl, an outer rib with ring grooves extends upwardly from the base wall, and the second material extends between the outer rib and the combustion bowl.

8. The piston of claim 7 further including a skirt portion extending downwardly from the outer rib to a lower end, and the skirt portion includes a pair of pin bosses disposed opposite one another and each presenting a pin bore.

9. The piston of claim 1 further including a skirt portion formed from the first material, and wherein a single piece of the first material forms the crown portion and the skirt portion.

10. A piston for an internal combustion engine, comprising:
a crown portion and a skirt portion formed from a first material;
a combustion surface disposed along the crown portion, wherein at least a portion of the combustion surface is formed from a second material by an additive machining process;
a heat affected zone defined by a first edge along the first material and a second edge along the second material, wherein the first edge has a shape following the shape of the second edge; and
wherein an underside of the combustion surface includes surface irregularities immediately following the additive machining process and prior to any subsequent machining; and the second material of the combustion surface includes martensite and tempered martensite in a crystalline structure.

11. A piston for an internal combustion engine, comprising:
a crown portion formed from a first material;
a combustion surface disposed along the crown portion, wherein at least a portion of the combustion surface is formed from a second material by an additive machining process;
a heat affected zone defined by a first edge along the first material and a second edge along the second material, wherein the first edge has a shape following the shape of the second edge; and
wherein an underside of the combustion surface includes surface irregularities immediately following the additive machining process and prior to any subsequent machining.

* * * * *